(12) United States Patent
Haandrikman et al.

(10) Patent No.: US 10,851,285 B2
(45) Date of Patent: Dec. 1, 2020

(54) ANTI-AGGLOMERATE HYDRATE INHIBITORS

(71) Applicant: SHELL OIL COMPANY, Houston, TX (US)

(72) Inventors: Gritienus Haandrikman, Amsterdam (NL); Daniel Lee Crosby, Sugar Land, TX (US); Michael David Greaves, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 16/336,980

(22) PCT Filed: Sep. 26, 2017

(86) PCT No.: PCT/US2017/053415
§ 371 (c)(1),
(2) Date: Mar. 27, 2019

(87) PCT Pub. No.: WO2018/064031
PCT Pub. Date: Apr. 5, 2018

(65) Prior Publication Data
US 2019/0218446 A1   Jul. 18, 2019

Related U.S. Application Data

(60) Provisional application No. 62/401,308, filed on Sep. 29, 2016.

(51) Int. Cl.
*C09K 8/52* (2006.01)
*C09K 8/524* (2006.01)

(52) U.S. Cl.
CPC .............. *C09K 8/52* (2013.01); *C09K 8/524* (2013.01); *C09K 2208/20* (2013.01); *C09K 2208/22* (2013.01)

(58) Field of Classification Search
CPC ............... C09K 15/28; C09K 19/38; C09K 2200/0607; C09K 2200/061; C09K 2205/126; C09K 2205/22; C09K 2205/40; C09K 2208/22; C09K 2208/32; C09K 3/1006; C09K 5/04; C09K 5/045; C09K 8/52; C09K 8/54; C09K 8/524; C09K 2208/20
See application file for complete search history.

(56) References Cited

U.S. PATENT DOCUMENTS

| 2,394,251 | A | * | 2/1946 | Morris | ...... | C10M 3/00 |
| | | | | | | 252/78.1 |
| 4,485,872 | A | * | 12/1984 | Stapp | ...... | C09K 8/584 |
| | | | | | | 166/270.1 |
| 5,076,364 | A | | 12/1991 | Hale et al. | | |
| 5,460,728 | A | | 10/1995 | Klomp et al. | | |
| 5,648,575 | A | | 7/1997 | Klomp et al. | | |
| 5,879,561 | A | | 3/1999 | Klomp et al. | | |
| 6,905,605 | B2 | | 6/2005 | Klomp | | |
| 7,696,393 | B2 | | 4/2010 | Rivers et al. | | |
| 8,814,473 | B2 | | 8/2014 | Hatton et al. | | |
| 8,878,052 | B2 | | 11/2014 | Hsu et al. | | |
| 2010/0144559 | A1 | * | 6/2010 | Rivers | ...... | C09K 8/52 |
| | | | | | | 507/102 |

FOREIGN PATENT DOCUMENTS

CN   103055652   *   4/2013

OTHER PUBLICATIONS

International Search Report and Written Opinion received for PCT Patent Application No. PCT/US2017/053415, dated Nov. 20, 2017, 8 pages.

* cited by examiner

*Primary Examiner* — Kumar R Bhushan

(57) ABSTRACT

A hydrate inhibitor comprising a sulfolane derivative and associated methods and compositions.

6 Claims, No Drawings

ANTI-AGGLOMERATE HYDRATE INHIBITORS

This is a National stage application of International Application No. PCT/US2017/053415, filed Sep. 26, 2017, which claims the benefit of U.S. Provisional Application No. 62/401,308, filed Sep. 29, 2016, which is incorporated herein by reference.

BACKGROUND

The present disclosure relates generally to anti-agglomerate hydrate inhibitors. More specifically, in certain embodiments, the present disclosure relates to anti-agglomerate hydrate inhibitors comprising sulfolane derivatives and associated compositions and methods.

Low-boiling hydrocarbons, such as methane, ethane, propane, butane, and iso-butane, are normally present in conduits used for the transport and processing of natural gas and crude oil. When varying amounts of water are also present in such conduits, the water/hydrocarbon mixture is, under conditions of low temperature and elevated pressure, capable of forming gas hydrate crystals. Gas hydrates are clathrates (inclusion compounds) in which small gas molecules are trapped in a lattice or cage consisting of water molecules.

The structure gas hydrates may depend on the type of the gas forming the structure: methane and ethane may form cubic lattices having a lattice constant of 1.2 nm (normally referred to as structure I) and propane and butane may form cubic lattices having a lattice constant of 1.73 nm (normally referred to as structure II). It is known that even the presence of a small amount of propane in a mixture of low-boiling hydrocarbons will result in the formation of structure II gas hydrates, the predominate hydrate encountered during the production of oil and gas.

Gas hydrate crystals are known to block or even damage the subsea conduits. In order to cope with this undesired phenomenon, a number of remedies have been proposed in the past such as removal of free water, maintaining elevated temperatures and/or reduced pressures or the addition of chemicals such as melting point depressants (antifreezes). Melting point depressants, typical examples of which are methanol and various glycols, often need to be added in substantial amounts in order to be effective. This is disadvantageous with respect to costs of the materials, their storage facilities and their recovery.

Another approach to keep the fluids in conduits flowing is adding nucleation and/or crystal growth inhibitors and/or compounds capable of preventing hydrate crystal agglomeration to the fluids. Compared to the amounts of antifreeze required, small amounts of such compounds are normally effective in preventing the blockage of a conduit by hydrates. The principles of interfering with crystal growth and/or agglomeration are known. These compounds are collective known as low dosage hydrate inhibitors or LDHIs.

Hydrate inhibitors are broadly divided into kinetic hydrate inhibitors, commonly abbreviated in the art as KHI's, and anti-agglomerates, commonly abbreviated in the art as AA's. Kinetic hydrate inhibitors seek to delay the nucleation and/or growth of gas hydrates in a controlled manor while AA's are designed to create a mobile, multiphase matrix containing relatively small hydrate particles. Anti-agglomerate hydrate inhibitors allow for the formation of hydrate particles that do not adhere or agglomerate, in part or in whole, to themselves and/or other available solid surfaces.

U.S. Pat. Nos. 8,814,473, 8,878,052, 7,696,393, 5,076,364, 5,879,561, 5,460,728, 5,648,575, and 6,905,605, the entireties of which are hereby incorporated by reference, describe several different types of anti-agglomerate hydrate inhibitors.

It would be advantageous to develop a new class of anti-agglomerate hydrate inhibitors

SUMMARY

The present disclosure relates generally to anti-agglomerate hydrate inhibitors. More specifically, in certain embodiments, the present disclosure relates to anti-agglomerate hydrate inhibitors comprising sulfolane derivatives and associated compositions and methods.

In one embodiment the present disclosure provides a hydrate inhibitor comprising a sulfolane derivative.

In another embodiment, the present disclosure provides a hydrate inhibitor composition comprising a hydrate inhibitor comprising a sulfolane derivative and carrier fluid.

In another embodiment, the present disclosure provides a method comprising: providing a hydrate inhibitor composition comprising a hydrate inhibitor comprising a sulfolane derivative and injecting the hydrate inhibitor composition into a well or pipeline.

DETAILED DESCRIPTION

The description that follows includes exemplary apparatuses, methods, techniques, and/or instruction sequences that embody techniques of the inventive subject matter. However, it is understood that the described embodiments may be practiced without these specific details.

The present disclosure relates generally to anti-agglomerate hydrate inhibitors. More specifically, in certain embodiments, the present disclosure relates to anti-agglomerate hydrate inhibitors comprising sulfolane derivatives and associated compositions and methods.

In certain embodiments, the present disclosure provides a hydrate inhibitor comprising a sulfolane derivative. As used herein, the term sulfolane derivative refers to a compound having the following structure:

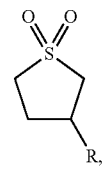

wherein R is selected from the group consisting of an alkyl chain, an alkenyl chain, an aryl chain, an arylalkyl chain, an arylalkenyl chain, an alkylaryl chain, an alkenylaryl chain, an amine, an amide, a sulfonamide, a phosphor amide, an acyl, an imide, an ethoxylated chain, a propoxylated chain, an alkylamino group, and a glycol group.

In certain embodiments, R may comprise 1 to 20 carbon atoms. In certain embodiments, R may comprise a normal, cyclic, unsaturated, or branched chain. In certain embodiments, R may comprise a chain comprising non carbon atoms. For example, in certain embodiments, R may comprise sulfur, nitrogen, and/or oxygen atoms.

In certain embodiments, R may comprise an alkylamino group comprising from 1 to 20 carbon atoms. In certain embodiments, R may comprise an alkylamino group comprising from 5 to 15 carbon atoms. In certain embodiments, R may comprise a decylamino group.

In certain embodiments, the sulfolane derivative may comprise a sulfolane derivative having the following structure:

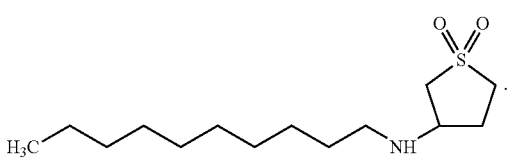 [SMILES: CCCCCCCCCCNC1CCS(=O)(=O)C1]

In certain embodiments, the sulfolane derivate may comprise 3-(decylamino)thiolane-1,1-dione.

In certain embodiments, the present disclosure provides a hydrate inhibitor composition comprising a hydrate inhibitor comprising a sulfolane derivative and a carrier fluid.

In certain embodiments, the sulfolane derivative may comprise any sulfolane derivative discussed above. In certain embodiments, the sulfolane derivative may be present in the hydrate inhibitor composition in an amount in the range of from 20 wt. % to 90 wt. %. In other embodiments, the sulfolane derivative may be present in the hydrate inhibitor composition in an amount in the range of from 50 wt. % to 70 wt. %.

In certain embodiments, the carrier fluid may comprise water, methanol, toluene, naphtha, a terpene, or any combination thereof. In certain embodiments, the carrier fluid may be present in the hydrate inhibitor composition in an amount in the range of from 10 wt. % to 80 wt. %. In certain embodiments, the carrier fluid may be present in the hydrate inhibitor composition in an amount in the range of from 30 wt. % to 50 wt. %.

In certain embodiments, the hydrate inhibitor composition may comprise any additive described in U.S. Pat. Nos. 8,814,473, 8,878,052, 7,696,393, 5,076,364, 5,879,561, 5,460,728, 5,648,575, and 6,905,605, the entireties of which are hereby incorporated by reference. Examples of such additives include corrosion inhibitors, wax inhibitors, asphaltene inhibitors, conventional hydrate inhibitors, and solvents.

In certain embodiments, the hydrate inhibitor composition may have a pH in the range form from 5 to 8. In certain embodiments, the hydrate inhibitor composition may have a natural pH or a near neutral pH.

In certain embodiments, the present invention provides a method comprising: providing a hydrate inhibitor composition comprising a hydrate inhibitor comprising a sulfolane derivative and injecting the hydrate inhibitor composition into a well or pipeline.

In certain embodiments, the hydrate inhibitor composition may comprise any hydrate inhibitor composition discussed above.

In certain embodiments, the well or pipeline may be a subsea well or pipeline. In certain embodiments, the well or pipeline may contain a flowable mixture of fluid capable of forming gas hydrates when exposed to certain flow conditions. Examples of flow conditions include pressures in the range of from 500 psig to 10,000 psig and temperatures in the range of from 32° F. to 35° F. In certain embodiments, the flowable mixture may have a flow condition with a pressure in the range of from 100 psig to 20,000 psig and a temperature in the range of from 25° F. to 40° F.

In certain embodiments, the flowable mixture may comprise water, liquid hydrocarbon, and gas. In certain embodiments, the water may be present in the flowable mixture at a concentration in the range of from 1 vol. % to 95 vol. %.

In certain embodiments, the water may comprise a brine.

In certain embodiments, the liquid hydrocarbon may comprise any type of crude oil or gas condensate.

In certain embodiments, the gas may comprise any gas selected from the group consisting of: methane, ethane, ethylene, acetylene, propane, propylene, methyl acetylene, n-butane, isobutane, 1-butene, trans-2-butene, cis-2-butene, isobutene, butane mixtures, isopentane, pentenes, natural gas, carbon dioxide, hydrogen sulfide, nitrogen, hydrogen, oxygen, argon, krypton, xenon, and any combination thereof.

In certain embodiments, the flowable mixtures may comprise gas hydrates.

In certain embodiments, injecting the hydrate inhibitor composition into the well or pipeline may comprise injecting the hydrate inhibitor composition into the well or pipeline by any conventional means. In certain embodiments, the hydrate inhibitor composition may be injected into the well or pipeline when the well or pipeline is in a shut-in condition. In other embodiments, the hydrate inhibitor composition may be injected into the well or pipeline while the well or pipeline is in a flowing condition.

In certain embodiments, the amount of hydrate inhibitor composition injected into the well or pipeline may depend on the composition of the flowable mixture. For example, in certain embodiments, the amount of hydrate inhibitor composition injected into the well or pipeline may be an amount sufficient to form a flowable mixture in the well or pipeline comprising water, liquid hydrocarbon, gas, and sulfolane derivative with a sulfolane derivative concentration in the range of from 0.1 wt. % to 5 wt. % based on the water content of the flowable mixture.

In certain embodiments, the amount of hydrate inhibitor composition injected into the well or pipeline is an amount sufficient to prevent the formation of agglomerations of hydrates. In certain embodiments, the amount of hydrate inhibitor composition injected into the well or pipeline is an amount sufficient to prevent the hydrate crystal growth. In certain embodiments, the amount of hydrate inhibitor composition injected into the well or pipeline is an amount sufficient to disperse a hydrate deposit.

In certain embodiments, the method may further comprise allowing the sulfolane derivative to prevent the formation of an agglomeration of hydrate crystals. In certain embodiments, the method may further comprise allowing the sulfolane derivative to prevent the formation of hydrate crystals. In certain embodiments, the method may further comprise allowing the sulfolane derivative to disperse a hydrate deposit.

In certain embodiments, the method may further comprise recovering the sulfolane derivative.

Without wishing to be limited to theory, it is believed that the hydrate inhibitors described herein function by creating fine (millimeter to micron size) hydrophobic gas hydrate particles that do not adhere to one another or the exposed surfaces of conduits. It is also believed that the hydrate inhibitors described herein are capable of positioning themselves at or in close proximity to the water-hydrocarbon interface thus hindering hydrate crystal growth. It is also believed that the hydrate inhibitors described herein prevent hydrate crystal growth by impeding access of water molecules with the hydrate crystal, rendering the surface of the hydrate crystal more hydrophobic and less hydrophilic. It is also believed that the hydrate inhibitors described herein impact hydrate crystal growth by imposing structural weakness in the hydrate crystal. It is also believed that the hydrate inhibitors described herein may preferably concentrate or partition into the hydrocarbon phase in a manner as to reduce the amount of the subject molecule within a water phase.

To facilitate a better understanding of the present invention, the following examples of certain aspects of some embodiments are given. In no way should the following examples be read to limit, or define, the scope of the invention.

EXAMPLES

The ability of a hydrate inhibitor comprising a sulfolane derivative to prevent hydrate formation was tested by using a "rolling ball apparatus".

A cylindrical metal and sapphire vessel that contained a stainless steel ball, which can freely roll back and forth over the entire (axial) length of the cell when the cell is tilted, was equipped with a pressure transducer to allow a reading of the gas pressure in the cell and some auxiliary tubing to facilitate cleaning and filling of the cell.

The vessel was filled with 5.6 mL of a liquid hydrocarbon, a gas blend comprising a 1.970 mol % carbon dioxide, 86.281 mol % methane, 6.000 mol % ethane, 3.920 mol % propane, 0.851 mol % i-butane, and 0.978 mol % n-butane, mixture of carbon dioxide, methane, ethane, propane, iso-butane, and n-butane, and 1.4 mL of a brine comprising 3.5 wt. % (w/v) NaCl and 5 wt. % (w/v) 3-(decylamino)thiolane-1,1-dione.

After being filled, the cell was pressurized with agitation to 72 bara at room temperature. Once the pressure had stabilized, the cell was linearly cooled to 5° C. over a 20 hour period. Hydrate formation was observed and evaluated at multiple junctures during the test.

It was observed that the hydrates formed in this experiment were less than 1 mm in size and did not display any cohesion to other hydrate crystals in the test cell. In addition, the hydrates formed were not observed to adhere to any of the interior surfaces of the cell.

After hydrate formation, the cell's ball rolled through the liquid matrix with ease and the liquid matrix was observed as mobile and fluid. It was concluded that the hydrate inhibitor tested effectively prevented the agglomeration of hydrates.

The vessel was also filled with 5.6 mL of a liquid hydrocarbon, a gas blend comprising a 1.970 mol % carbon dioxide, 86.281 mol % methane, 6.000 mol % ethane, 3.920 mol % propane, 0.851 mol % i-butane, and 0.978 mol % n-butane, mixture of carbon dioxide, methane, ethane, propane, iso-butane, and n-butane, and 1.4 mL of a brine comprising 3.5 wt. % (w/v) NaCl and no sulfolane derivative. After being filled, the cell was pressurized with agitation to 72 bara at room temperature. Once the pressure had stabilized, the cell was linearly cooled to 5° C. over a 20 hour period. Hydrate formation was observed and evaluated at multiple junctures during the test. After hydrate formation, the cell's ball did not roll through the liquid matrix with ease.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

That which is claimed is:

1. A method for inhibiting the formation of agglomerates of gas hydrates in a mixture of fluids comprising water, liquid hydrocarbon and gas, the method comprising the steps of:

providing a hydrate inhibitor composition comprising a sulfolane derivative having the following structure:

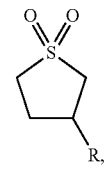

wherein R is selected from the group consisting of an alkyl chain, an alkenyl chain, an aryl chain, an aryalkyl chain, an arylalkenyl chain, an alkylaryl chain, an alkenylaryl chain, an amine, an amide, a sulfonamide, a phosphor amide, an acyl, an imide, an ethoxylated chain, a propoxylated chain, an alkylamino group, and a glycol group;
and
injecting the hydrate inhibitor composition into a well or pipeline having the mixture of fluids in an amount sufficient to form a flowable mixture comprising the mixture of fluids and the sulfolane derivatieve with a concentration in a range from 0.1 wt. % to 5 wt. % based on the water content in the flowable mixture to inhibit the formation of agglomerates of gas hydrates in the mixture of fluids.

2. The method of claim 1, wherein the R group comprises 1 to 20 carbon atoms.

3. The method of claim 1, wherein the R group is an alkylamino group.

4. The method of claim 1, wherein the R group is a decylamino group.

5. The method of claim 1, wherein the sulfolane derivative comprises 3-(decylamino)thiolane-1,1-dione.

6. The method of claim 1, wherein the hydrate inhibitor composition further comprises a carrier fluid.

* * * * *